US008325258B2

(12) United States Patent
Sugiyama et al.

(10) Patent No.: US 8,325,258 B2
(45) Date of Patent: Dec. 4, 2012

(54) SOLID-STATE IMAGING DEVICE INCLUDING IMAGING PHOTODETECTING ARRANGEMENT AND TRIGGER PHOTODETECTING ARRANGEMENT AND IMAGING METHOD

(75) Inventors: Yukinobu Sugiyama, Hamamatsu (JP); Seiichiro Mizuno, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 544 days.

(21) Appl. No.: 12/515,639

(22) PCT Filed: Nov. 20, 2007

(86) PCT No.: PCT/JP2007/072454
§ 371 (c)(1),
(2), (4) Date: Jun. 16, 2009

(87) PCT Pub. No.: WO2008/062786
PCT Pub. Date: May 29, 2008

(65) Prior Publication Data
US 2009/0268067 A1    Oct. 29, 2009

(30) Foreign Application Priority Data

Nov. 22, 2006  (JP) .................................. 2006-316015

(51) Int. Cl.
*H04N 3/14* (2006.01)
*H04N 5/335* (2011.01)
*H01L 27/00* (2006.01)
*H05G 1/64* (2006.01)
(52) U.S. Cl. ..................... 348/302; 250/208.1; 378/98.8
(58) Field of Classification Search .................. 348/297, 348/302, 308; 250/208.1; 378/98.8
See application file for complete search history.

(56) References Cited

U.S. PATENT DOCUMENTS

| | | | | |
|---|---|---|---|---|
| 5,444,756 | A * | 8/1995 | Pai et al. ....................... | 378/98.8 |
| 6,069,935 | A | 5/2000 | Schick et al. | |
| 7,116,459 | B2 * | 10/2006 | Huffman ....................... | 359/239 |
| 2003/0146991 | A1* | 8/2003 | Barna et al. ................... | 348/302 |
| 2007/0176109 | A1* | 8/2007 | Bell ........................ | 250/370.09 |

FOREIGN PATENT DOCUMENTS

| | | |
|---|---|---|
| EP | 1 408 315 | 4/2004 |
| JP | 6-507796 | 9/1994 |
| JP | 10-137229 | 5/1998 |
| JP | 2001-116846 | 4/2001 |
| JP | 2002-505002 | 2/2002 |
| JP | 2004-205359 | 7/2004 |
| JP | 2005-33722 | 2/2005 |
| JP | 2005-117101 | 4/2005 |
| WO | WO 2005/122551 | 12/2005 |

* cited by examiner

*Primary Examiner* — Kelly L Jerabek
(74) *Attorney, Agent, or Firm* — Drinker Biddle & Reath LLP

(57) ABSTRACT

A determination unit 70 determines whether there is incident light, based on an output value from an integrating circuit 62, and generates a determinated signal indicating a determinated result. A control unit 80 controls charge accumulating portions of an imaging light-receiving unit 10 whether or not to start accumulation of an electric charge, based on the determinated signal, and changes a charge accumulation capacitance value of the integrating circuit 62 of an output unit 60. Specifically, the control unit 80 varies the capacitance value for accumulation of an electric charge generated in a trigger light-receiving unit 20, depending upon the detection result on the presence/absence of incident light, to switch the sensitivity of the integrating circuit 62 to the trigger PD, thereby enabling optimal utilization of the trigger PD.

9 Claims, 10 Drawing Sheets

SOLID-STATE IMAGING DEVICE INCLUDING IMAGING PHOTODETECTING ARRANGEMENT AND TRIGGER PHOTODETECTING ARRANGEMENT AND IMAGING METHOD

TECHNICAL FIELD

The present invention relates to a solid-state imaging apparatus and imaging method.

BACKGROUND ART

Patent Document 1 discloses a conventional solid-state imaging apparatus intended for use in X-ray imaging, for example, in the oral cavity. In this use, an X-ray incidence period for imaging is extremely short and the solid-state imaging apparatus needs to capture an X-ray incidence time to image the X-ray. Therefore, the solid-state imaging apparatus disclosed in Patent Document 1 has a trigger photodiode (hereinafter also referred to as "trigger PD") for detection of X-ray incidence, in addition to an imaging light-receiving device including a plurality of pixel photodiodes (hereinafter also referred to as "pixel PDs") two-dimensionally arrayed for X-ray imaging. Then this solid-state imaging apparatus monitors an electric signal output from the trigger PD to detect X-ray incidence and thereafter obtains an X-ray image, based on electric signals output from the imaging light-receiving device.

Patent Document 1: Japanese Patent Application Laid-open (translation of PCT application) No. 2002-505002

DISCLOSURE OF THE INVENTION

Problem to be Solved by the Invention

In the conventional solid-state imaging apparatus, as described above, the electric signal output from the trigger PD is used as a lead for detecting X-ray incidence, and can also be used for calculating a total X-ray exposure in certain cases. Namely, there are also cases where, for example, the operation of the imaging light-receiving device including the plurality of pixel PDs is controlled based on the electric signal output from the trigger PD, and the trigger PD is thus an important element to control overall operation and performance of the solid-state imaging apparatus.

The present invention has been accomplished under the above-described circumstances and an object of the present invention is therefore to provide a solid-state imaging apparatus and imaging method enabling optimal utilization of the trigger photodiode.

Means for Solving the Problem

In order to solve the above problem, a solid-state imaging apparatus according to the present invention comprises: imaging photodetecting means including a plurality of pixel units each of which has a photodiode to generate an electric charge in an amount according to a quantity of incident light, and a charge accumulating portion to accumulate the electric charge, the imaging photodetecting means being configured to accumulate the electric charge generated in the photodiode, in the charge accumulating portion in each of the plurality of pixel units; trigger photodetecting means including a trigger photodiode to generate an electric charge in an amount according to a quantity of incident light; output means configured to output a value according to an amount of the electric charge accumulated in the charge accumulating portion in each of the plurality of pixel units, the output means including an integrating circuit to accumulate the electric charge generated in the trigger photodetecting means, in a variable capacitance portion, and being configured to output a value according to an amount of the electric charge accumulated in the integrating circuit; determinating means configured to determine whether there is incident light to the trigger photodetecting means, based on the output value from the integrating circuit, and to generate a determinated signal indicating a determinated result; and controlling means configured to control the charge accumulating portions of the imaging photodetecting means whether or not to start accumulation of the electric charge, based on the determinated signal input from the determinating means, and to change a capacitance value of the variable capacitance portion in the integrating circuit of the output means.

An imaging method according to the present invention comprises: a trigger photodetecting step wherein trigger photodetecting means including a trigger photodiode generates an electric charge in an amount according to a quantity of incident light; a first output step wherein output means including an integrating circuit to accumulate the electric charge generated in the trigger photodetecting step, in a variable capacitance portion outputs a value according to an amount of the electric charge accumulated in the integrating circuit; a determinating step wherein determinating means determines whether there is incident light to the trigger photodetecting means, based on the value output in the first output step, and generates a determinated signal indicating a determinated result; a controlling step wherein controlling means controls charge accumulating portions of imaging photodetecting means whether or not to start accumulation of an electric charge, based on the determinated signal generated in the determinating step, and changes a capacitance value of the variable capacitance portion in the integrating circuit of the output means; an imaging photodetecting step wherein, under the control in the controlling step, the imaging photodetecting means including a plurality of pixel units each of which has a photodiode to generate an electric charge in an amount according to a quantity of incident light, and a charge accumulating portion to accumulate the electric charge, accumulates the electric charge generated in the photodiode, in the charge accumulating portion in each of the plurality of pixel units; and a second output step wherein the output means outputs a value according to an amount of the electric charge accumulated in the charge accumulating portion in each of the plurality of pixel units of the imaging photodetecting means.

In the solid-state imaging apparatus and imaging method of the present invention as described above, the determinating means determines whether there is incident light to the trigger photodetecting means, based on the output value from the integrating circuit, and generates the determinated signal indicating the determinated result. In this connection, the output value from the integrating circuit may be a digital value. The controlling means controls the charge accumulating portions of the imaging photodetecting means whether or not to start accumulation of the electric charge, based on the determinated signal, and changes the capacitance value of the variable capacitance portion in the integrating circuit of the output means. Namely, the controlling means varies the capacitance value for accumulation of the electric charge generated in the trigger photodetecting means, depending upon the detection result on the presence/absence of incident light. In this case, preferably, the controlling means increases the capacitance value of the variable capacitance portion in the integrating circuit when the determinated signal indicates detection of incidence of light. Namely, the controlling means controls the charge accumulation capacitance value of the integrating circuit at a low level before detection of incident light and changes the charge accumulation capacitance value of the integrating circuit to a high level after detection of incident light.

Incidentally, in the case where the output signal from the trigger photodetecting means including the trigger photodiode (trigger PD) is used for detection of incident light, the sensitivity of the integrating circuit to the trigger PD is preferably set as high as possible, so as to be highly sensitive to incidence of light. On the other hand, in the case where the output signal from the trigger PD is used, for example, for calculation of a total exposure of incident light, the sensitivity of the integrating circuit to the trigger PD is preferably set as low as possible, so as to avoid saturation of the output signal from the trigger PD in the integrating circuit. The reason for it is as follows: if the output signal from the trigger PD saturates in the integrating circuit, it will become infeasible to accurately calculate the total exposure of incident light and this will adversely affect, for example, determination on a termination time of the charge accumulation operation in the charge accumulating portions, based on the total exposure.

In the solid-state imaging apparatus and imaging method of the present invention, the controlling means varies the charge accumulation capacitance value of the integrating circuit between two different levels before and after detection of incident light, thereby enabling switching of the sensitivity of the integrating circuit to the trigger PD. This allows the sensitivity of the integrating circuit to the trigger PD to be set as high as possible before detection of incident light, so as to be highly sensitive to incident light. Furthermore, the sensitivity of the integrating circuit to the trigger PD is set as low as possible after detection of incident light, thereby avoiding the saturation of the output signal from the trigger PD in the integrating circuit. As described above, the present invention enables optimal utilization of the trigger PD in such a manner that the controlling means varies the charge accumulation capacitance value of the integrating circuit between different levels before and after detection of incident light to switch the sensitivity of the integrating circuit to the trigger PD.

In the solid-state imaging apparatus the determinating means determines that there is incident light, if a peak value of the output value from the integrating circuit is not less than a predetermined threshold and if an accumulated total of the output value from the integrating circuit during a predetermined period is not less than a predetermined threshold.

According to the present invention, when the determinating means determines that there is incident light, the determination is made in consideration of whether the instantaneous peak value of the output value from the integrating circuit and the accumulated total during the predetermined period are not less than the respective predetermined thresholds. This allows the determinating means to determine whether the output signal from the trigger PD is based on actual exposure of incident light or due to other noise. The reason is that it is often the case in detection of noise that the output signal from the trigger PD and through the integrating circuit shows its peak value at a certain magnitude but the value is generally instantaneous, without continuity over the predetermined period.

Another solid-state imaging apparatus according to the present invention comprises: imaging photodetecting means including a plurality of pixel units each of which has a photodiode to generate an electric charge in an amount according to a quantity of incident light, and a charge accumulating portion to accumulate the electric charge, the imaging photodetecting means being configured to accumulate the electric charge generated in the photodiode, in the charge accumulating portion in each of the plurality of pixel units; trigger photodetecting means including a trigger photodiode to generate an electric charge in an amount according to a quantity of incident light; output means configured to output a value according to an amount of the electric charge accumulated in the charge accumulating portion in each of the plurality of pixel units, the output means including an integrating circuit to accumulate the electric charge generated in the trigger photodetecting means, in a variable capacitance portion, and being configured to output a value according to an amount of the electric charge accumulated in the integrating circuit; and controlling means configured to control the charge accumulating portions of the imaging photodetecting means whether or not to start accumulation of the electric charge, based on an external input signal generated based on the output value from the integrating circuit and indicating whether there is incident light to the trigger photodetecting means, and to change a capacitance value of the variable capacitance portion in the integrating circuit of the output means.

Another imaging method according to the present invention comprises: a trigger photodetecting step wherein trigger photodetecting means including a trigger photodiode generates an electric charge in an amount according to a quantity of incident light; a first output step wherein output means including an integrating circuit to accumulate the electric charge generated in the trigger photodetecting step, in a variable capacitance portion outputs a value according to an amount of the electric charge accumulated in the integrating circuit; a controlling step wherein controlling means controls charge accumulating portions of imaging photodetecting means whether or not to start accumulation of an electric charge, based on an external input signal generated based on the value output in the first output step and indicating whether there is incident light to the trigger photodetecting means, and changes a capacitance value of the variable capacitance portion in the integrating circuit of the output means; an imaging photodetecting step wherein, under the control in the controlling step, the imaging photodetecting means including a plurality of pixel units each of which has a photodiode to generate an electric charge in an amount according to a quantity of incident light, and a charge accumulating portion to accumulate the electric charge, accumulates the electric charge generated in the photodiode, in the charge accumulating portion in each of the plurality of pixel units; and a second output step wherein the output means outputs a value according to an amount of the electric charge accumulated in the charge accumulating portion in each of the plurality of pixel units of the imaging photodetecting means.

In the solid-state imaging apparatus and imaging method of the present invention as described above, the controlling means controls the charge accumulating portions of the imaging photodetecting means whether or not to start accumulation of the electric charge, based on the external input signal generated based on the output value from the integrating circuit and indicating whether there is incident light to the trigger photodetecting means, and changes the charge accumulation capacitance value of the integrating circuit of the output means. Namely, the controlling means varies the capacitance value for accumulation of the electric charge generated in the trigger photodetecting means, depending upon the detection result on the presence/absence of incident light. In this case, preferably, the controlling means increases the capacitance value of the variable capacitance portion in the integrating circuit when the external input signal indicates detection of incidence of light. Namely, the controlling means controls the charge accumulation capacitance value of the integrating circuit at a low level before detection of incident light and changes the charge accumulation capacitance value of the integrating circuit to a high level after detection of incident light.

In other words, the solid-state imaging apparatus and imaging method of the present invention are configured so that the controlling means varies the charge accumulation capacitance value of the integrating circuit between the different levels before and after detection of incident light, thereby enabling switching of the sensitivity of the integrating circuit to the trigger PD. This configuration permits such setting that the sensitivity of the integrating circuit to the trigger PD is set as high as possible before detection of incident light, so as to be highly sensitive to incident light. Furthermore, the sensitivity of the integrating circuit to the trigger PD is set as low as possible after detection of incident light, thereby avoiding the saturation of the output signal from the trigger PD in the integrating circuit. As described above, the present invention enables optimal utilization of the trigger PD in such a manner that the controlling means varies the charge accumulation capacitance value of the integrating circuit between the different levels before and after detection of incident light to switch the sensitivity of the integrating circuit to the trigger PD.

Furthermore, since in this case the external input signal is generated outside the apparatus, for example, by an optional external device, conditions in generation of the external input signal can be flexibly adjusted in the external device.

Effect of the Invention

The present invention enables optimal utilization of the trigger photodiode.

Figure 1:
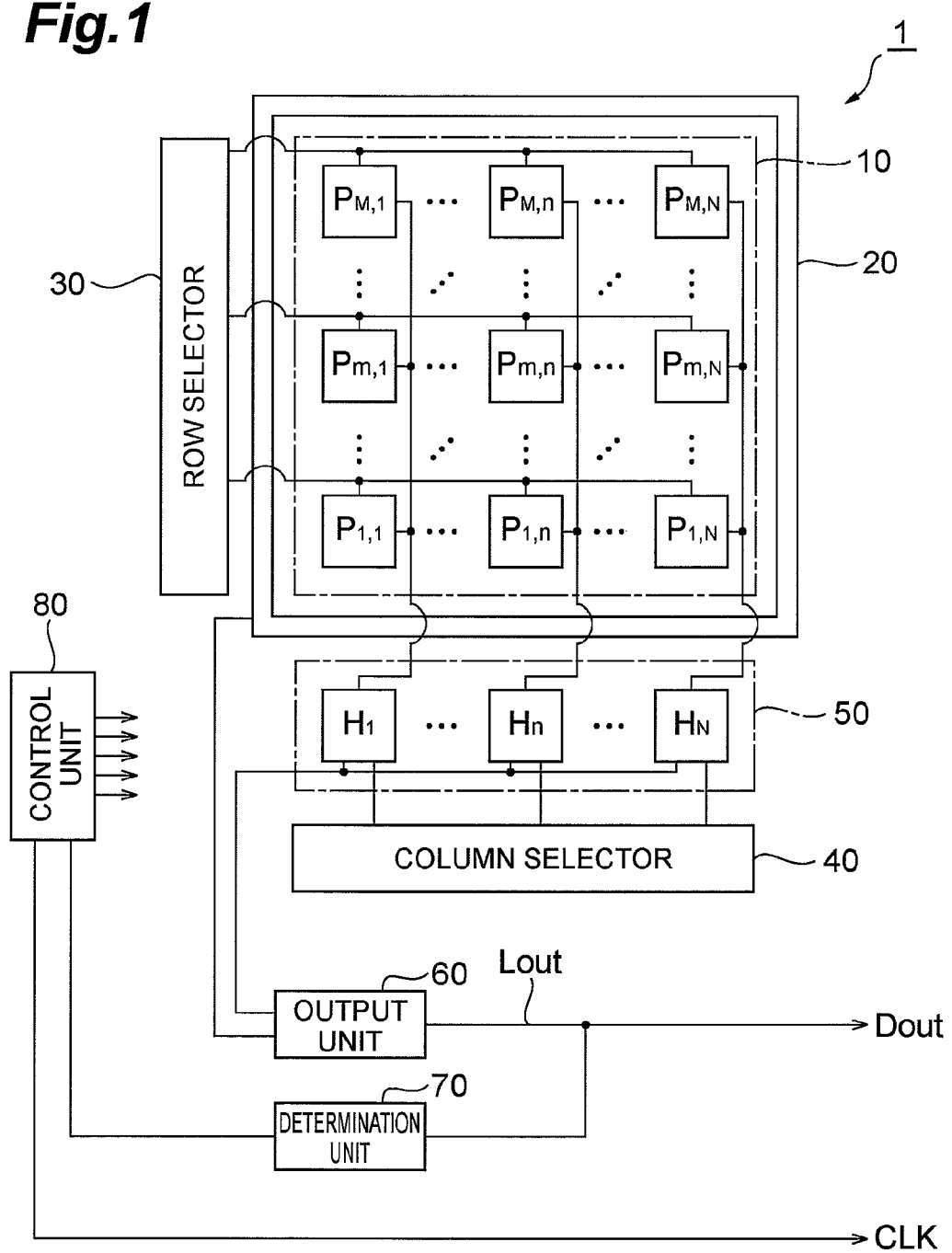
FIG. 1 is a schematic diagram of a configuration of a solid-state imaging apparatus according to the first embodiment.

DESCRIPTION OF REFERENCE SYMBOLS 1, 100 solid-state imaging apparatus; 10 imaging light-receiving unit; 20 trigger light-receiving unit; 30 row selector; 40 column selector; 50 voltage holding unit; 60 output unit; 61 difference calculation circuit; 62 integrating circuit; 63 imaging A/D conversion circuit; 64 trigger A/D conversion circuit; 70 determination unit; 80 control unit.

BEST MODE FOR CARRYING OUT THE INVENTION

The preferred embodiments of the solid-state imaging apparatus and imaging method according to the present invention will be described below in detail with reference to the accompanying drawings. In the description of the drawings the same elements will be denoted by the same reference symbols, without redundant description. It is noted that dimensional ratios in the drawings do not always agree with those in the description.

First Embodiment

FIG. 1 is a schematic view of a configuration of solid-state imaging apparatus 1 according to the first embodiment. The solid-state imaging apparatus 1 shown in this figure has an imaging light-receiving unit 10 (imaging photodetecting means), a trigger light-receiving unit 20 (trigger photodetecting means), a row selector 30, a column selector 40, a voltage holding unit 50, an output unit 60 (output means), a determination unit 70 (determinating means), and a control unit 80 (controlling means). It is noted that interconnections between elements in this figure are omitted or simplified.

The imaging light-receiving unit 10 is provided for pickup of an image of incident light and includes pixel units $P_{1,1}$-$P_{M,N}$ two-dimensionally arrayed in M rows and N columns. Pixel unit $P_{m,n}$ is located in the mth row and the nth column. The M×N pixel units $P_{1,1}$-$P_{M,N}$ share a common configuration and each of them has a photodiode (pixel PD) to generate an electric charge in an amount according to a quantity of incident light, and a charge accumulating portion to accumulate the electric charge. The imaging light-receiving unit 10 is so configured that the charge accumulating portion accumulates the electric charge generated in the pixel PD, in each of the M×N pixel units $P_{1,1}$-$P_{M,N}$ during a period indicated by a charge accumulation operation control signal output from the control unit 80. Each of M and N is an integer of not less than 2, m an integer of not less than 1 nor more than M, and n an integer of not less than 1 nor more than N.

The trigger light-receiving unit 20 is provided for detection of incidence of light and includes a trigger photodiode (trigger PD) to generate an electric charge in an amount according to a quantity of incident light. A variety of forms can be contemplated as to the number and arrangement of the trigger PD included in the trigger light-receiving unit 20, and a preferred configuration is such that the trigger PD is provided so as to surround the imaging light-receiving unit 10 and that its light-receiving area is wide. The trigger light-receiving unit 20 preferably includes one trigger PD provided so as to surround the imaging light-receiving unit 10 as shown, or preferably includes a plurality of trigger PDs provided around the imaging light-receiving unit 10 and connected in parallel to each other.

The row selector 30 sequentially designates each of the rows in the imaging light-receiving unit 10, under control of the control unit 80, to output a voltage value according to an amount of an electric charge accumulated in each of the charge accumulating portions of the respective N pixel units $P_{m,1}$-$P_{m,N}$ in the designated mth row, to the voltage holding unit 50. The row selector 30 includes an M-stage shift register circuit and can sequentially designate each of the rows in the imaging light-receiving unit 10 by output bits of respective stages of the shift register circuit.

The voltage holding unit 50 includes N holding circuits $H_1$-$H_N$ sharing a common configuration. The holding circuit $H_n$ is connected to M pixel units $P_{1,n}$-$P_{M,n}$ in the nth column in the imaging light-receiving unit 10 and is configured to retrieve a voltage value output from any one pixel unit $P_{m,n}$ out of them, hold the retrieved voltage value, and output it. The holding circuit $H_n$ can hold a voltage value indicating a signal component with a noise component superimposed thereon, and also hold a voltage value indicating the noise component.

The column selector 40 sequentially designates the N holding circuits $H_1$-$H_N$ included in the voltage holding unit 50, to output a voltage value held in the designated nth holding circuit $H_n$, to the output unit 60. The column selector 40 includes an N-stage shift register circuit and can sequentially designate the N holding circuits $H_1$-$H_N$ by output bits of respective stages of this shift register circuit.

The output unit 60 outputs a digital value according to an amount of an electric charge accumulated in the charge accumulating portion in each of the M×N pixel units $P_{1,1}$-$P_{M,N}$ (will also be referred to as "pixel data"), after a lapse of a period indicated by a charge accumulation operation control signal output from the control unit 80 (i.e., a period for the charge accumulating portion to accumulate the electric charge generated in the pixel PD in each pixel unit $P_{m,n}$). Furthermore, the output unit 60 outputs a digital value according to an amount of an electric charge generated in the trigger light-receiving unit 20 (which will also be referred to as "trigger data"), during periods in which the aforementioned pixel data is not output. The output unit 60 preferably operates with lower power consumption in output of the trigger data than that in output of the pixel data.

The output unit 60 preferably outputs the pixel data and the trigger data onto a common output signal line Lout and also preferably outputs these data as serial data. In these cases, the number of interconnections for output of these data can be reduced, which is advantageous in terms of improvement in reliability.

The determination unit 70 retrieves the trigger data output from the output unit 60, determines whether there is incident light to the solid-state imaging apparatus 1, based on the trigger data, and generates a determinated signal indicating the result of the determination. For determining the presence/absence of incident light, it is necessary to determine whether the data output from the output unit 60 is based on exposure of incident light or due to other noise. Therefore, the determination unit 70 determines that incident light is "present," if an instantaneous peak value of the data output from the output unit 60 is not less than a predetermined threshold and if an accumulated total during a predetermined period of the data output from the output unit 60 is not less than a predetermined threshold. The reason for it is that with actual exposure of incident light, the data output from the output unit 60 should have a certain magnitude and be a value continuing during a duration of irradiation. On the other hand, it is often the case in detection of noise that the data output from the output unit 60 has a certain magnitude but the value is generally instantaneous, without continuity over a predetermined period. The determination unit 70 generates a determinated signal indicating the result of the determination on the presence/absence of incident light, and outputs the determinated signal to the control unit 80.

The control unit 80 controls the overall operation of the solid-state imaging apparatus 1. For example, the control unit 80 controls the row selection operation in the row selector 30, the column selection operation in the column selector 40, the data holding operation in the voltage holding unit 50, the output operations of the pixel data and trigger data in the output unit 60, and the determination operation in the determination unit 70. Furthermore, the control unit 80 outputs a clock signal CLK synchronized with output timings of respective bits in each of the pixel data and trigger data by the output unit 60.

The control unit 80 retrieves the determinated signal output from the determination unit 70. When this determinated signal indicates exposure of incident light to the solid-state imaging apparatus 1, the control unit 80 controls the charge accumulating portion in each of the pixel units $P_{1,n}$-$P_{M,n}$ of the imaging light-receiving unit 10 to start accumulation of the electric charge. Specifically, the control unit 80 generates and outputs a charge accumulation operation control signal which instructs the charge accumulating portion in each of the pixel units $P_{1,n}$-$P_{M,n}$, to start the charge accumulation operation. Furthermore, the control unit 80 changes the sensitivity of the integrating circuit 62 to the trigger PD of the trigger light-receiving unit 20 to a low sensitivity level, immediately after the output of the charge accumulation operation control signal. A method of changing the sensitivity will be described later.

After the charge accumulation operation control signal is output to let the charge accumulating portion in each of the pixel units $P_{1,n}$-$P_{M,n}$ of the imaging light-receiving unit 10 start accumulation of the electric charge, the control unit 80 retrieves the trigger data output from the output unit 60. Based on this trigger data, the control unit 80 calculates a total exposure of incident light to the solid-state imaging apparatus 1. Then, based on the total exposure calculated, the control unit 80 determines the termination timing of the charge accumulation operation by the charge accumulating portion. Specifically, the control unit 80 determines a time when the total exposure reaches a predetermined threshold, as the termination timing of the charge accumulation operation and reflects the termination timing into the charge accumulation operation control signal. This permits the control unit 80 to terminate the charge accumulation operation of the charge accumulating portions.

The charge accumulation operation control signal to instruct each of the pixel units $P_{1,n}$-$P_{M,n}$ of the imaging light-receiving unit 10 to perform the charge accumulation operation may be directly supplied from the control unit 80 to the imaging light-receiving unit 10, and may be one to instruct each pixel unit to perform the charge accumulation operation, together with control signals (Reset(m) signal, Trans(m) signal, and Hold(m) signal described later) given to gate terminals of respective transistors included in each pixel unit $P_{m,n}$. Another applicable method is such that the charge accumulation operation control signal is supplied from the control unit 80 to the row selector 30 and control signals supplied to the gate terminals of the respective transistors in each pixel unit $P_{m,n}$ are generated based on this charge accumulation operation control signal.

Figure 2:
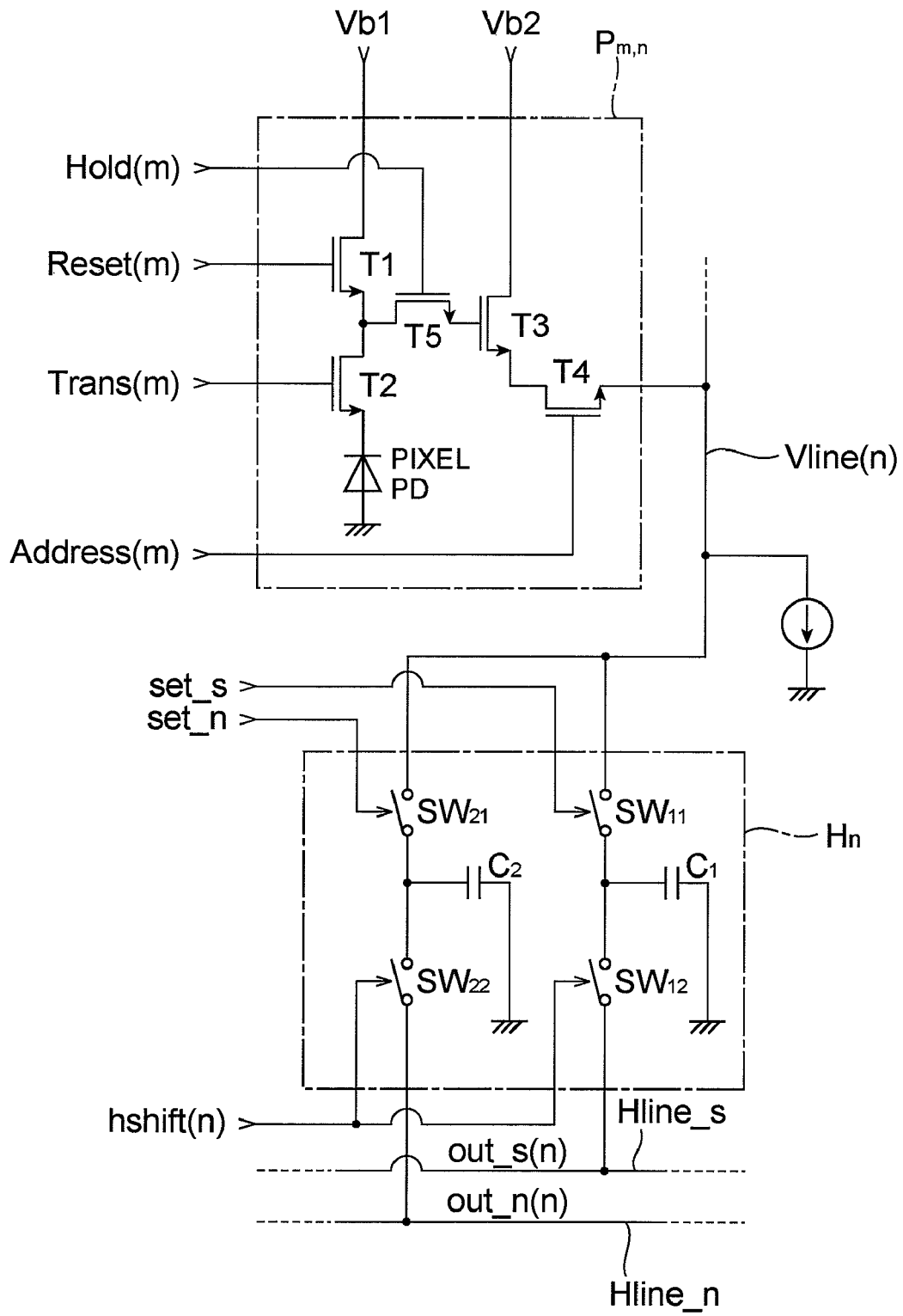
FIG. 2 is a schematic view showing respective circuit configurations of pixel unit $P_{m,n}$ and holding circuit $H_n$ in FIG. 1.

FIG. 2 is a schematic diagram showing respective circuit configurations of pixel unit $P_{m,n}$ and holding circuit $H_n$ included in the solid-state imaging apparatus 1 of the first embodiment. This figure shows the pixel unit $P_{m,n}$ on behalf of the M×N pixel units $P_{1,1}$-$P_{M,N}$ and the holding circuit $H_n$ on behalf of the N holding circuits $H_1$-$H_N$.

The pixel unit $P_{m,n}$ is, for example, of the APS (Active Pixel Sensor) system and includes a pixel PD and five MOS transistors T1-T5. As shown in this figure, the transistor T1, transistor T2, and pixel PD are serially connected in order, a reference voltage Vb1 is input to the drain terminal of the transistor T1, and the anode terminal of the pixel PD is grounded.

The transistor T3 and transistor T4 are serially connected, a reference voltage Vb2 is input to the drain terminal of the transistor T3, and the source terminal of the transistor T4 is connected to a line Vline(n). A node between transistor T1 and transistor T2 is connected through transistor T5 to the gate terminal of the transistor T3. A constant current source is connected to the line Vline(n).

A Reset(m) signal is input to the gate terminal of the transistor T1, a Trans(m) signal is input to the gate terminal of the transistor T2, an Address(m) signal is input to the gate terminal of the transistor T4, and a Hold(m) signal is input to the gate terminal of the transistor T5. These Reset(m) signal, Trans(m) signal, Address(m) signal, and Hold(m) signal are output from the row selector 30 under control of the control unit 80 and commonly input to the N pixel units $P_{m,1}$-$P_{m,N}$ in the mth row.

When the Reset(m) signal and Trans(m) signal are at a high level, a junction capacitance portion (charge accumulating portion) of the pixel PD is discharged; in addition, when the Hold(m) signal is also at a high level, the potential at the gate terminal of the transistor T3 is reset. Thereafter, when the Reset(m) signal, Trans(m) signal, and Hold(m) signal are turned to a low level, the electric charge generated in the pixel PD start being accumulated in the junction capacitance portion. When the Hold(m) signal is at the low level and the Address(m) signal at the high level, the noise component is output from the pixel unit $P_{m,n}$ onto the line Vline(n). When the Trans(m) signal, Hold(m) signal, and Address(m) signal are turned to the high level, a voltage value according to an amount of the electric charge accumulated in the junction capacitance portion of the pixel PD is output as a signal component onto the line Vline(n).

The holding circuit $H_n$ includes two capacitance elements $C_1$, $C_2$, and four switches $SW_{11}$, $SW_{12}$, $SW_{21}$, $SW_{22}$. In this hold circuit $H_n$, the switch $SW_{11}$, and switch $SW_{12}$ are serially connected and disposed between line Vline(n) and line Hline_s, one end of the capacitance element $C_1$ is connected to a node between switch $SW_{11}$ and switch $SW_{12}$, and the other end of the capacitance element $C_1$ is grounded. The switch $SW_{21}$ and switch $SW_{22}$ are serially connected and disposed between line Vline(n) and line Hline_n, one end of the capacitance element $C_2$ is connected to a node between switch $SW_{21}$, and switch $SW_{22}$, and the other end of the capacitance element $C_2$ is grounded.

In the hold circuit $H_n$, the switch $SW_{11}$ opens and closes according to levels of a set_s signal supplied from the control unit 80. The switch $SW_{21}$ opens and closes according to levels of a set_n signal supplied from the control unit 80. The set_s signal and set_n signal are commonly input to the N hold circuits $H_1$-$H_n$. The switches $SW_{12}$, $SW_{22}$ open and close according to levels of an hshift(n) signal supplied from the control unit 80.

In this hold circuit $H_n$, when the set_n signal is turned from a high level to a low level to open the switch $SW_{21}$, the noise component being output from the pixel unit $P_{m,n}$ onto the line Vline(n) is held as a voltage value out_n(n) in the capacitance element $C_2$ since then. When the set_s signal is turned from a high level to a low level to open the switch $SW_{11}$, the signal component being output from the pixel unit $P_{m,n}$ onto the line Vline(n) is held as a voltage value out_s(n) in the capacitance element $C_1$ since then. When the hshift(n) signal is then turned to a high level, the switch $SW_{12}$ is closed to output the voltage value out_s(n) held in the capacitance element $C_1$, onto the line Hline_s and the switch $SW_{22}$ is closed to output the voltage value out_n(n) held in the capacitance element $C_2$, onto the line Hline_n. A difference between these voltage value out_s(n) and voltage value out_n(n) indicates a voltage value according to an amount of the electric charge generated in the pixel PD of the pixel unit $P_{m,n}$.

Figure 3:
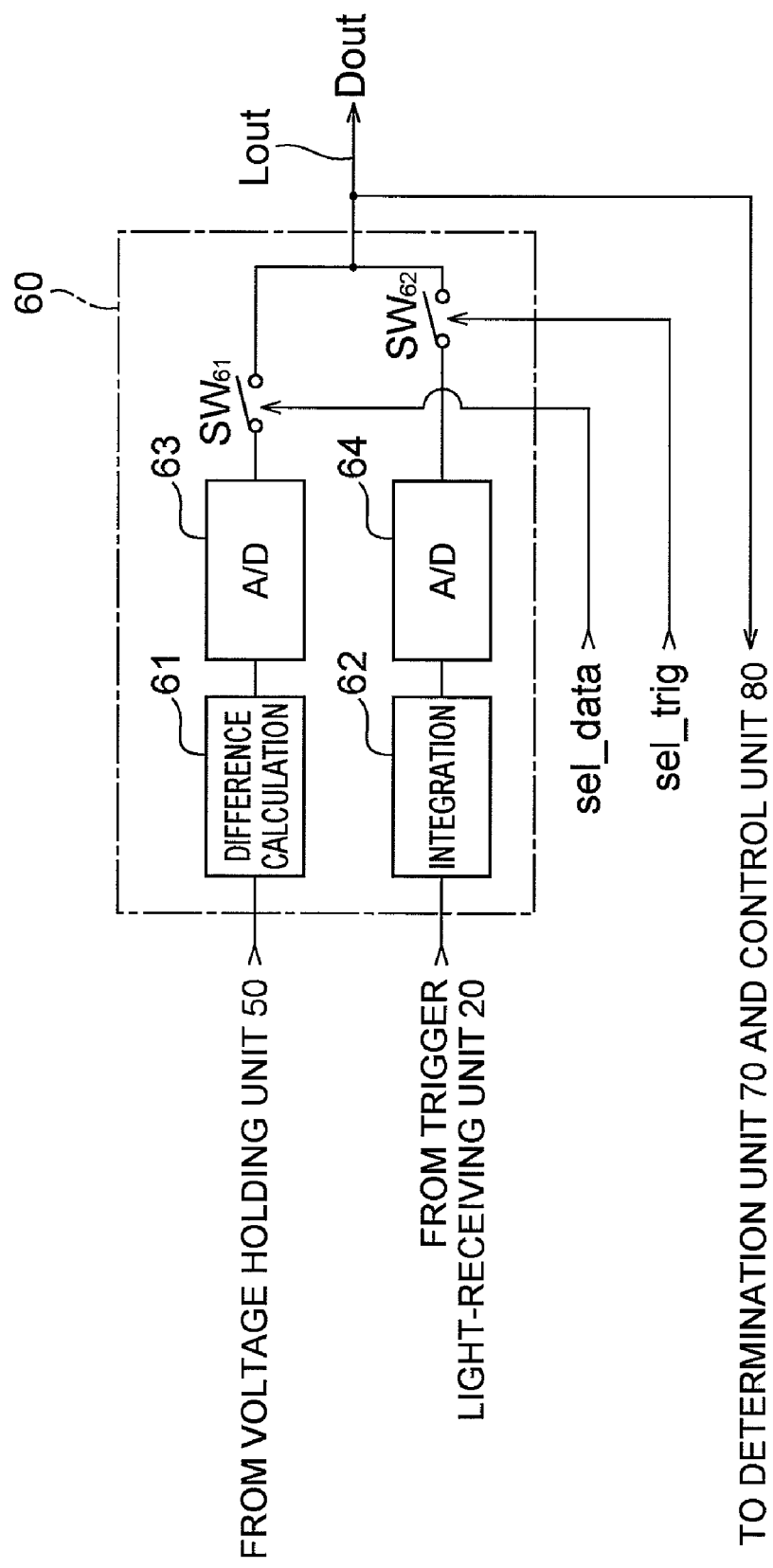
FIG. 3 is a schematic diagram of a configuration of output unit 60 in FIG. 1.

FIG. 3 is a schematic diagram of a configuration of the output unit 60 included in the solid-state imaging apparatus 1 of the first embodiment. The output unit 60 shown in this figure has a difference calculation circuit 61, an integrating circuit 62, an imaging A/D conversion circuit 63, a trigger A/D conversion circuit 64, a switch $SW_{61}$, and a switch $SW_{62}$.

The difference calculation circuit 61 retrieves a voltage value indicating a signal component on which a noise component is superimposed, from the holding circuit $H_n$, also retrieves a voltage value indicating the noise component, from the holding circuit $H_n$, and outputs a voltage value according to a difference between them. The voltage value output from this difference calculation circuit 61 indicates the signal component without the noise component. The detailed circuit configuration and others of this difference calculation circuit 61 will be described later.

The integrating circuit 62 retrieves and accumulates the electric charge output from the trigger light-receiving unit 20 and outputs a voltage value according to an amount of the accumulated electric charge. The integrating circuit 62 constructed including a capacitance element (variable capacitance portion) is configured so as to be able to switch a total of the charge accumulation capacitance value. The detailed circuit configuration and others of this integrating circuit 62 will be described later.

The imaging A/D conversion circuit 63 retrieves the voltage value output from the difference calculation circuit 61, subjects this input voltage value to A/D conversion, and outputs a digital value (pixel data) as a result of the A/D conversion. The trigger A/D conversion circuit 64 retrieves the voltage value output from the integrating circuit 62, subjects this input voltage value to A/D conversion, and outputs a digital value (trigger data) as a result of the A/D conversion.

The imaging A/D conversion circuit 63 performs the A/D conversion operation after a lapse of the period indicated by the charge accumulation operation control signal and outputs the pixel data. The trigger A/D conversion circuit 64 outputs the trigger data during periods in which the imaging A/D conversion circuit 63 outputs no pixel data. It is noted that the trigger A/D conversion circuit 64 may be configured to operate at lower speed or lower output bits than the imaging A/D conversion circuit 63 does.

The switch $SW_{61}$ is controlled by a sel_data signal output from the control unit 80, to open and close, and, when closed, it outputs the pixel data output from the imaging A/D conversion circuit 63, onto the output signal line Lout. The switch $SW_{62}$ is controlled by a sel_trig signal output from the control unit 80, to open and close and, when closed, it outputs the trigger data output from the trigger A/D conversion circuit 64, onto the output signal line Lout. The switch $SW_{61}$ and the switch $SW_{62}$ are not closed simultaneously.

Although not shown, the output unit 60 may have one common A/D conversion circuit as the aforementioned imaging A/D conversion circuit 63 and trigger A/D conversion circuit 64. In that case, the A/D conversion circuit may be configured to operate at lower speed or lower output bits in output of the trigger data than in output of the pixel data. For example, where the A/D conversion circuit is of the pipeline system, the number of stages to be operated is made smaller in output of the trigger data than in output of the pixel data. For example, where the A/D conversion circuit is of the successive approximation type using a plurality of capacitance elements, the number of capacitance elements to be used is made smaller in output of the trigger data than in output of the pixel data.

Figure 4:
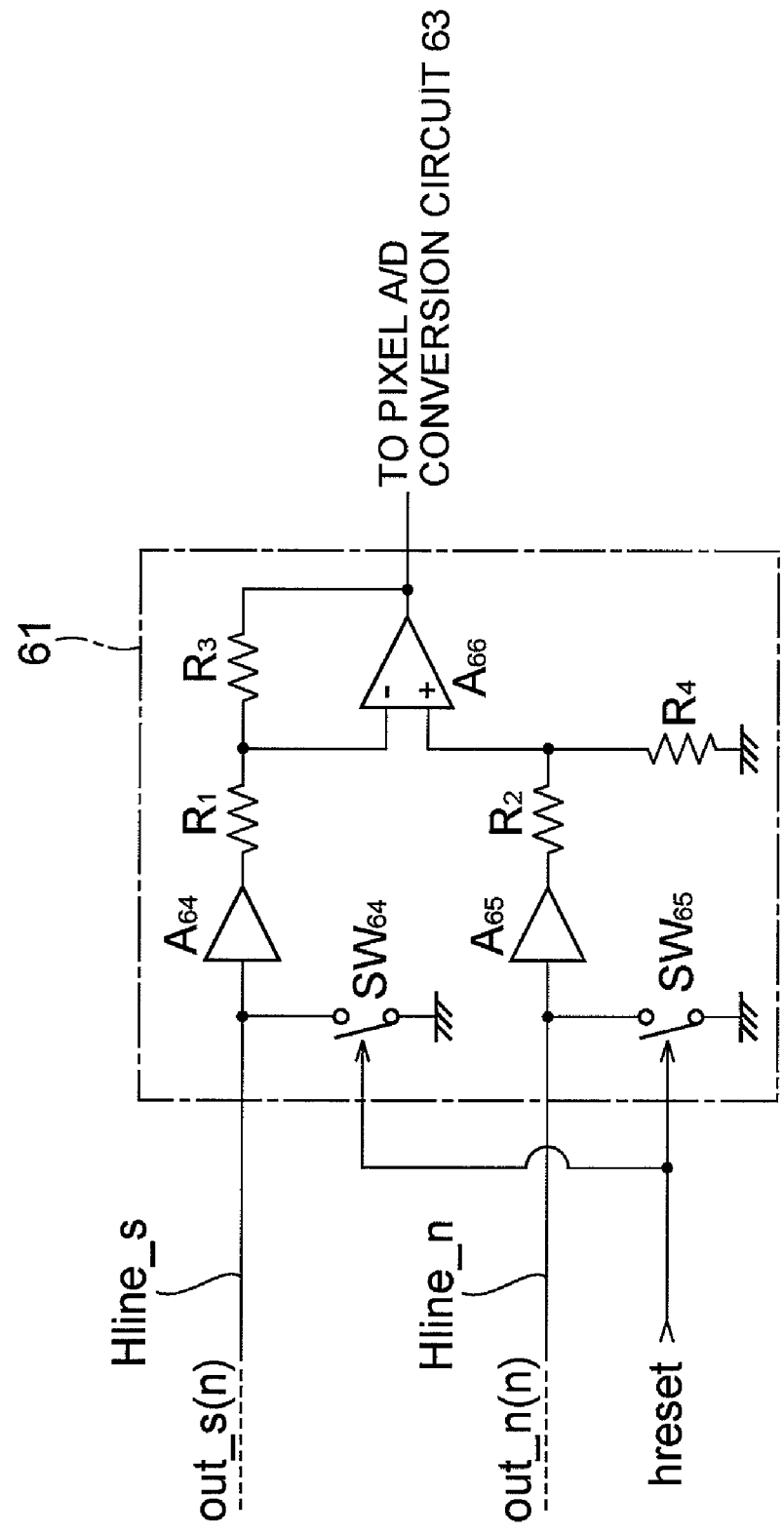
FIG. 4 is a schematic diagram showing a circuit configuration of difference calculation circuit 61 in FIG. 3.

FIG. 4 is a schematic diagram showing a circuit configuration of the difference calculation circuit 61 included in the solid-state imaging apparatus 1 of the first embodiment. As shown in this figure, the difference calculation circuit 61 includes amplifiers $A_{64}$-$A_{66}$, switches $SW_{64}$, $SW_{65}$, and resistors $R_1$-$R_4$. An inverting input terminal of the amplifier $A_{66}$ is connected through the resistor $R_1$ to an output terminal of the buffer amplifier $A_{64}$ and through the resistor $R_3$ to an output terminal of its own. A non-inverting input terminal of the amplifier $A_{66}$ is connected through the resistor $R_2$ to an output terminal of the buffer amplifier $A_{65}$ and through the resistor $R_4$ to the ground potential. The output terminal of the amplifier $A_{66}$ is connected to an input terminal of the pixel A/D conversion circuit 63. An input terminal of the buffer amplifier $A_{64}$ is connected through the line Hline_s to the N holding circuits $H_1$-$H_N$ and through the switch $SW_{64}$ to the ground potential. An input terminal of the buffer amplifier $A_{65}$ is connected through the line Hline_n to the N holding circuits $H_1$-$H_N$ and through the switch $SW_{65}$ to the ground potential.

The switches $SW_{64}$, $SW_{65}$ in the difference calculation circuit 61 are controlled by an hreset signal to open and close. When the switch $SW_{64}$ is closed, a voltage value input to the input terminal of the buffer amplifier $A_{64}$ is reset. When the switch $SW_{65}$ is closed, a voltage value input to the input terminal of the buffer amplifier $A_{65}$ is reset. When the switches $SW_{64}$, $SW_{65}$ are opened, voltage values out_s(n), out_n(n) output from any one holding circuit $H_n$, out of the N holding circuits $H_1$-$H_N$ onto the lines Hline_s, Hline_n are input to the input terminals of the buffer amplifiers $A_{64}$, $A_{65}$, respectively. Supposing an amplification rate of each of the buffer amplifiers $A_{64}$, $A_{65}$ is 1 and respective resistances of the four resistors $R_1$-$R_4$ are equal to each other, the voltage value output from the output terminal of the difference calculation circuit 61 represents the difference between the voltage values input through the respective lines Hline_s and Hline_n.

Figure 5:
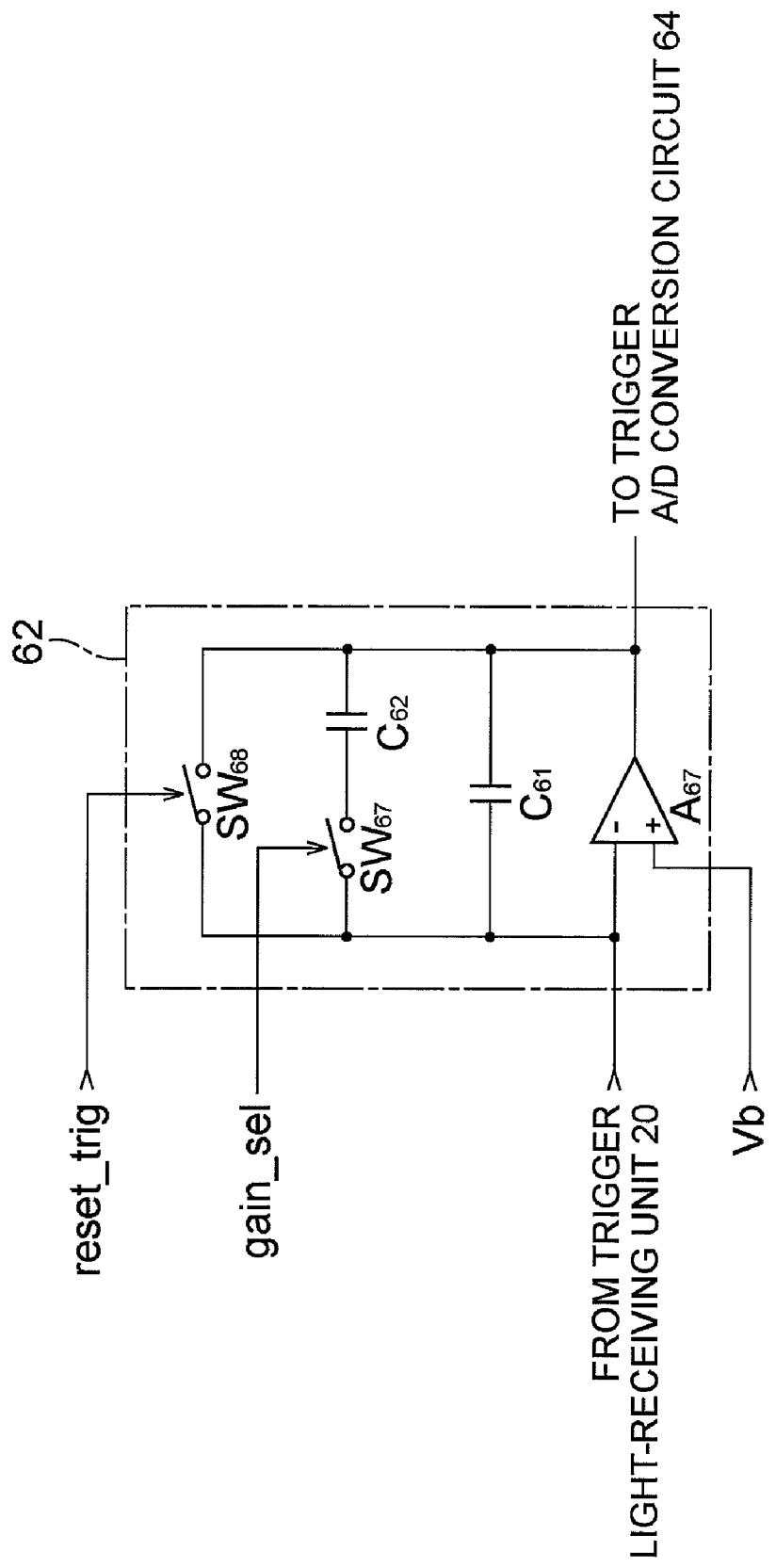
FIG. 5 is a schematic diagram showing a circuit configuration of integrating circuit 62 in FIG. 3.

FIG. 5 is a schematic diagram showing a circuit configuration of the integrating circuit 62 included in the solid-state imaging apparatus 1 of the first embodiment. As shown in this figure, the integrating circuit 62 includes an amplifier $A_{67}$, capacitance elements $C_{61}$, $C_{62}$ and switches $SW_{67}$, $SW_{68}$. As illustrated, the capacitance element $C_{61}$, the switch $SW_{67}$ and capacitance element $C_{62}$ connected in series, and the switch $SW_{68}$ are connected in parallel with each other and disposed between an inverting input terminal and an output terminal of the amplifier $A_{67}$. The inverting input terminal of the amplifier $A_{67}$ is connected to the trigger light-receiving unit 20. A non-inverting input terminal of the amplifier $A_{67}$ is connected to a reference potential Vb. The output terminal of the amplifier $A_{67}$ is connected to the input terminal of the trigger A/D conversion circuit 64.

The switch $SW_{67}$ of the integrating circuit 62 is controlled by a gain_sel signal output from the control unit 80, to open and close. The switch $SW_{68}$ of the integrating circuit 62 is controlled by a reset_trig signal output from the control unit 80, to open and close. When the switch $SW_{67}$ and switch $SW_{68}$ are closed, the capacitance elements $C_{61}$, $C_{62}$ are discharged to reset a voltage value output from the integrating circuit 62. Before the charge accumulating portions of the respective pixel units $P_{m,1}$-$P_{m,N}$ start the charge accumulation operation by the aforementioned charge accumulation operation control signal, the gain_sel signal is at a low level and the switch $SW_{67}$ is opened. On the other hand, after the above charge accumulation operation is started by the charge accumulation operation control signal, the gain_sel signal is turned to a high level and the switch $SW_{67}$ is closed.

When the switch $SW_{68}$ is opened and when the switch $SW_{67}$ is opened, the electric charge output from the trigger light-receiving unit 20 is accumulated only in the capacitance element $C_{61}$. On the other hand, when the switch $SW_{68}$ is opened and when the switch $SW_{67}$ is closed, the electric charge output from the trigger light-receiving unit 20 is accumulated in the capacitance element $C_{61}$ and the capacitance element $C_{62}$. In this case, the sensitivity of the integrating circuit 62 to the trigger PD of the trigger light-receiving unit 20 becomes lower by the degree of increase in the total capacitance of the capacitance elements to accumulate the electric charge output from the trigger light-receiving unit 20. In other words, the control unit 80 is able to change the total accumulation capacitance value to the electric charge output from the trigger light-receiving unit 20, by generating and outputting the gain_sel signal, thereby changing the sensitivity of the integrating circuit 62 to the trigger PD. The integrating circuit 62 outputs a voltage value according to the accumulated charge amount, to the trigger A/D conversion circuit 64.

Figure 6:
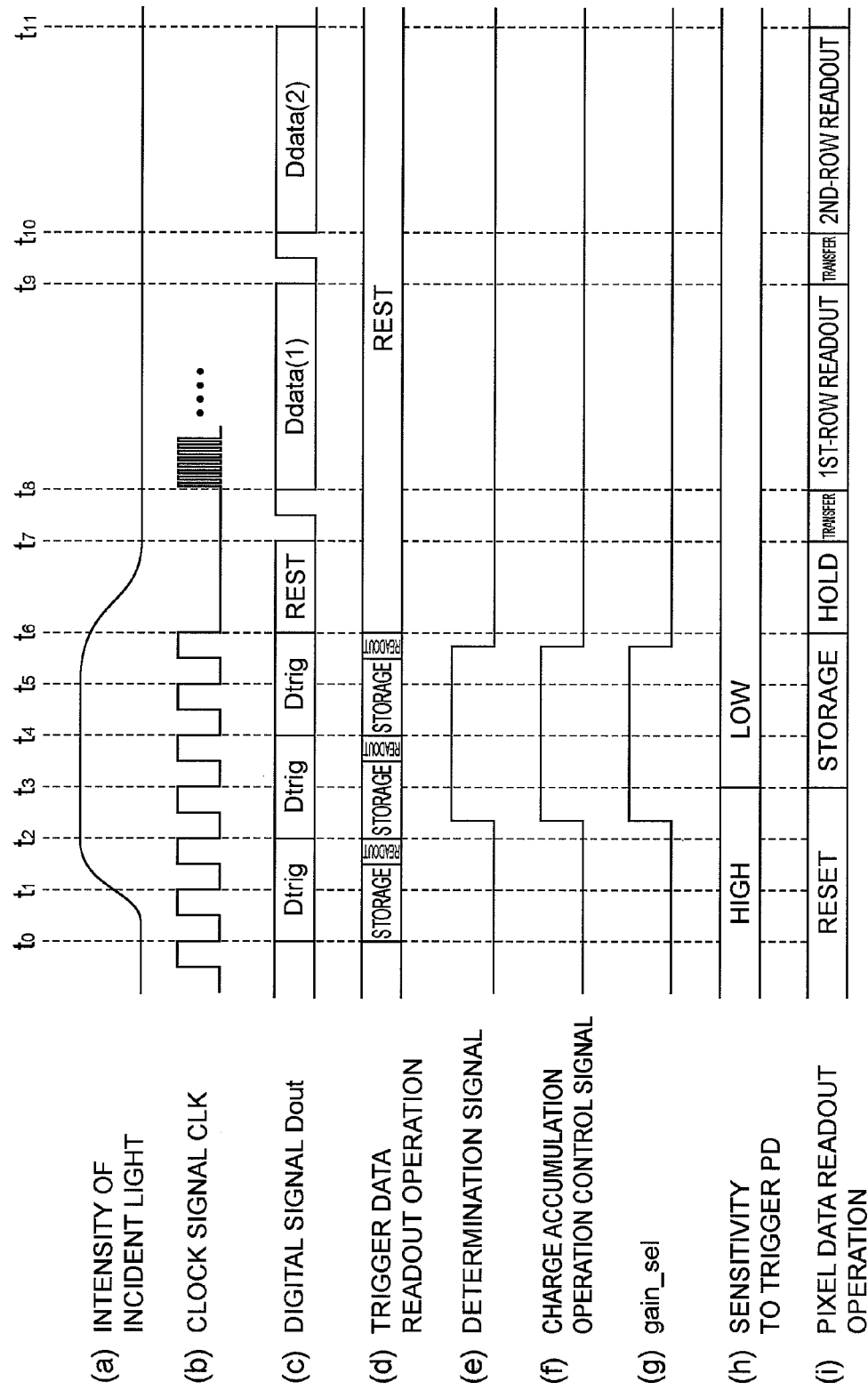
FIG. 6 is a timing chart showing an example of operation of the solid-state imaging apparatus according to the first embodiment.

The following will explain an example of the operation (imaging method) of the solid-state imaging apparatus 1 according to the first embodiment. FIG. 6 is a timing chart showing an example of the operation of the solid-state imaging apparatus 1 of the first embodiment. The solid-state imaging apparatus 1 operates under control of the control unit 80. This figure provides the following information in order from the top: (a) intensity of light incident to the solid-state imaging apparatus 1; (b) clock signal CLK output from the control unit 80; (c) digital signal Dout output from the output unit 60 onto the output signal line Lout (pixel data Ddata(m), trigger data Dtrig, or rest); (d) state of trigger data readout operation (accumulation, readout, or rest) by trigger light-receiving unit 20, integrating circuit 62, and trigger A/D conversion circuit 64; (e) determinated signal output from the determination unit 70; (f) charge accumulation operation control signal output from the control unit 80; (g) gain_sel signal output from the control unit 80; (h) sensitivity (high sensitivity level or low sensitivity level) of the integrating circuit 62 to the trigger PD; (i) state of pixel data readout operation (reset, accumulation, hold, transfer, or mth-row readout) by imaging light-receiving unit 10, voltage holding unit 50, difference calculation circuit 61, and imaging A/D conversion circuit 63.

In this figure, Ddata(m) represents the digital value (pixel data) output for the mth row of the imaging light-receiving unit 10 from the imaging A/D conversion circuit 63, and Dtrig the digital value (trigger data) output from the trigger A/D conversion circuit 64. Times $t_0$, $t_1$, $t_2$, $t_3$, $t_4$, $t_5$, and $t_6$ indicate fall times of the clock signal CLK output from the control unit 80. It is assumed that no light is incident to the solid-state imaging apparatus 1 before time $t_0$ and after time $t_7$ and that light is incident to the solid-state imaging apparatus 1 in a period ranging from time $t_0$ time $t_7$.

Although not depicted in FIG. 6, a reset operation before time $t_0$ will be first explained. During a certain period immediately after power activation to the solid-state imaging apparatus 1, the charge accumulation operation control signal output from the control unit 80 is turned to a high level. After this charge accumulation operation control signal is turned to a low level, the output unit 60 outputs the pixel data of one frame from the imaging light-receiving unit 10 through the voltage holding unit 50, difference calculation circuit 61, imaging A/D conversion circuit 63, and switch $SW_{61}$. The pixel data output at this time is insignificant, but, since the charge accumulation operation control signal is maintained at the high level over the certain period after the power activation, each pixel unit $P_{m,n}$ of the imaging light-receiving unit 10 and other circuits are reset, so as to enable normal operation thereafter.

Thereafter, before time $t_0$, the trigger data Dtrig according to an amount of received light by the trigger light-receiving unit 20 is output from the output unit 60 through the integrating circuit 62, trigger A/D conversion circuit 64, and switch $SW_{62}$. The clock signal CLK output from the control unit 80 is one synchronized with output timings of respective bits of the trigger data. Then the determination unit 70 determines that an instantaneous peak value of the trigger data Dtrig and an accumulated total thereof during the predetermined period are smaller than their respective predetermined thresholds and, therefore, determines that no light is incident to the solid-state imaging apparatus 1 (or that an amount of incident light is smaller than a fixed level), and the charge accumulation operation control signal is maintained still at the low level.

Before time $t_0$, each of the pixel units $P_{1,1}$-$P_{M,N}$ of the imaging light-receiving unit 10 is kept in a reset state. Namely, the Reset(m) signal, Trans(m) signal, and Hold(m) signal supplied from the row selector 30 to each pixel unit $P_{m,n}$ all are set at the high level, and the transistors T1, T2, and T5 are thus in an on state to discharge the junction capacitance portion (charge accumulating portion) of each pixel PD and reset the potential at the gate terminal of the transistor T3. Furthermore, the imaging A/D conversion circuit 63 is in a rest state and the switch $SW_{61}$ is opened.

Figure 7:
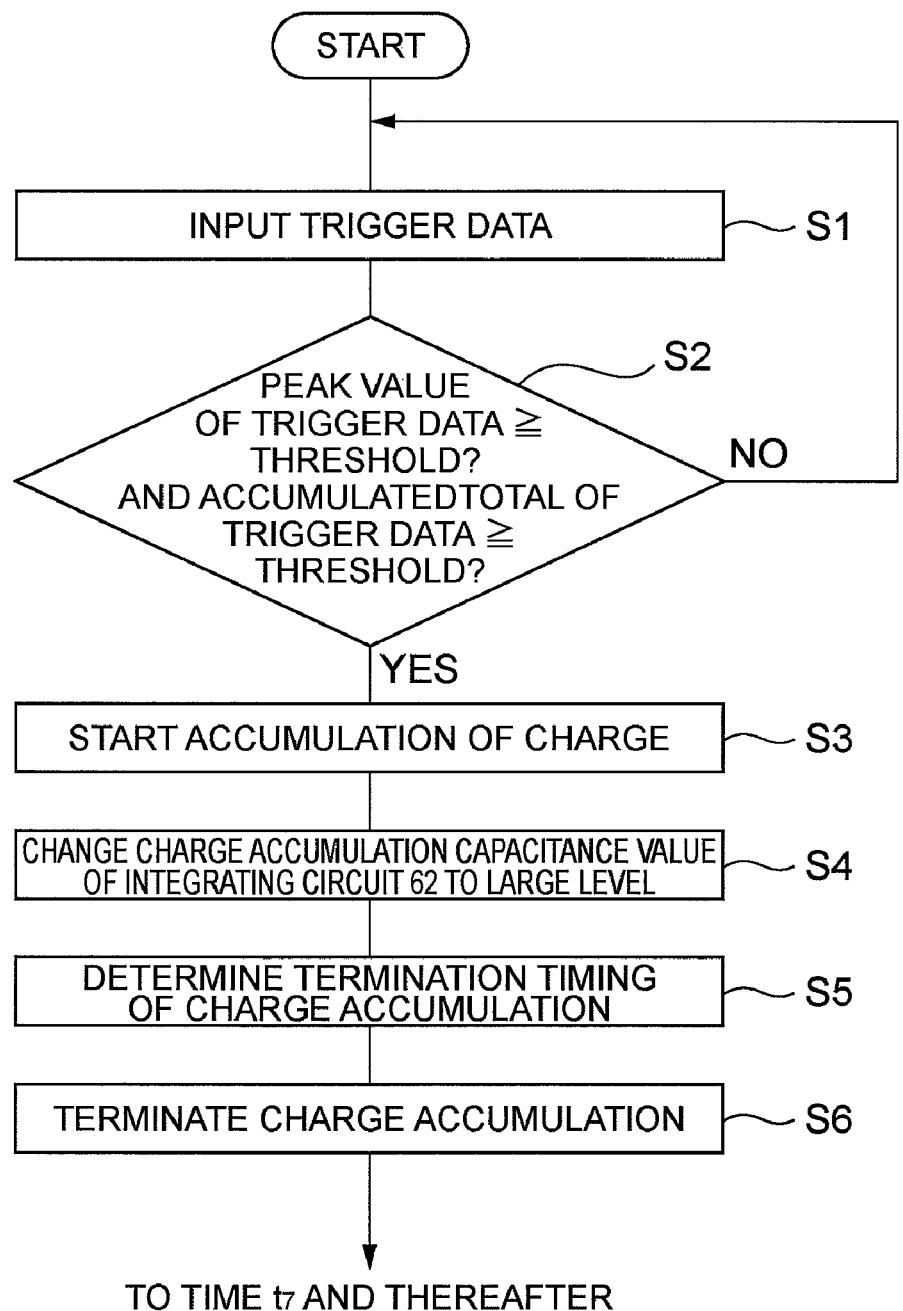
FIG. 7 is a flowchart showing an example of operation of the solid-state imaging apparatus according to the first embodiment.

The following will explain the operation after time $t_0$, further referring to the flowchart of FIG. 7. FIG. 7 is a flowchart showing the operation of the solid-state imaging apparatus 1 in the period from time to time $t_7$ shown in FIG. 6.

First, the determination unit 70 retrieves the trigger data Dtrig output from the output unit 60 (step S1).

Next, the determination unit 70 determines whether there is incident light to the solid-state imaging apparatus 1, based on the trigger data Dtrig input in step S1, and generates a determinated signal indicating the determinated result. Specifically, the determination unit 70 determines that incident light is "present," if the instantaneous peak value of the trigger data Dtrig output from the output unit 60 is not less than the predetermined threshold and if the accumulated total of the trigger data Dtrig during the predetermined period is not less than the predetermined threshold (step S2: YES). The determination unit 70 generates the determinated signal indicating that incident light is "present," by turning the determinated signal to the high level after time $t_2$, as shown in FIG. 6 (e), and outputs the determinated signal to the control unit 80.

On the other hand, the determination unit 70 determines that incident light is "absent," if the instantaneous peak value of the trigger data Dtrig is less than the predetermined threshold or if the accumulated total of the trigger data Dtrig during the predetermined period is less than the predetermined threshold (step S2: NO). The determination unit 70 generates the determinated signal indicating that incident light is "absent," by maintaining the determinated signal at the low level, as shown in FIG. 6 (e), and outputs the determinated signal to the control unit 80. In this case, the flow of processing returns to step S1.

Next, the control unit 80 retrieves the determinated signal output from the determination unit 70 in step S2. When this determinated signal indicates exposure of incident light to the solid-state imaging apparatus 1, the charge accumulation operation control signal is turned to the high level after time $t_2$, as shown in FIG. 6 (f). From the fall time $t_3$ of the clock signal CLK after the turn of the charge accumulation operation control signal to the high level, the Reset(m) signal, Trans(m) signal, and Hold(m) signal are turned to the low level to turn the transistors T1, T2, and T5 off in each pixel unit $P_{m,n}$ of the imaging light-receiving unit 10, and the electric charge generated in each pixel PD starts being accumulated in the junction capacitance portion, as shown in FIG. 6 (i). This is continuously carried out up to the fall time $t_6$ of the clock signal CLK (termination timing of the charge accumulation operation) after a next turn of the charge accumulation operation control signal to the low level, as described below (step S3).

When the determinated signal output from the determination unit 70 in step S2 indicates that there is no exposure of incident light to the solid-state imaging apparatus 1, the control unit 80 maintains the charge accumulation operation control signal at the low level, as shown in FIG. 6 (f), to keep the reset state without accumulation of the electric charge, as shown in FIG. 6 (i).

Immediately after the turn of the charge accumulation operation control signal to the high level, the control unit 80 changes the gain_sel signal to the high level, as shown in FIG. 6 (g), to close the switch $SW_{67}$. This allows the control unit 80 to change the total accumulation capacitance value of the integrating circuit 62 for the electric charge output from the trigger light-receiving unit 20, whereby the sensitivity of the integrating circuit 62 to the trigger PD is changed from the high sensitivity level before detection of incident light (before the start of accumulation by the charge accumulating portions) to the low sensitivity level after detection of incident light (after the start of accumulation by the charge accumulating portions), as shown in FIG. 6 (h) (step S4).

In FIG. 6, during a period from the time $t_3$ to the time $t_6$, the trigger data Dtrig according to an amount of received light by the trigger light-receiving unit 20 is output from the output unit 60 through the integrating circuit 62, trigger A/D conversion circuit 64, and switch $SW_{62}$. The clock signal CLK output from the control unit 80 is one synchronized with output timings of respective bits of the trigger data. Furthermore, the imaging A/D conversion circuit 63 is in a rest state and the switch $SW_{61}$ is opened. Based on the trigger data Dtrig output at this time, the control unit 80 calculates the total exposure of incident light to the solid-state imaging apparatus 1. Then, based on the calculated total exposure, the control unit 80 determines the termination timing of the charge accumulation operation by the charge accumulating portions. Specifically, the control unit 80 determines a time when the total exposure reaches the predetermined threshold (a time between time $t_5$ and time $t_6$ in the example shown in FIG. 6), as the termination timing of the charge accumulation operation, and turns the charge accumulation operation control signal to the low level, as shown in FIG. 6 (f), to reflect the determined termination timing into the charge accumulation operation control signal (step S5).

During a period from fall time $t_6$ to time $t_7$ of the clock signal CLK after the turn of the charge accumulation operation control signal to the low level, the Reset(m) signal and Address(m) signal are turned to the low level to turn the transistors T1, T4 off and the Trans(m) signal and Hold(m) signal are turned to the high level to turn the transistors T2, T5 on, in each pixel unit $P_{m,n}$ of the imaging light-receiving unit 10. This terminates the charge accumulation operation by the charge accumulating portions, as shown in FIG. 6 (i), and the electric charge accumulated in the junction capacitance portion up to this point migrates through the transistors T2, T5 to the gate terminal of the transistor T3 to be held there. However, since the transistor T4 is kept in an off state, the voltage value according to the accumulated charge amount is not output from each pixel unit $P_{m,n}$ onto the line Vline(n). During this period from time $t_6$ to time $t_7$, as shown in FIG. 6 (c), the imaging A/D conversion circuit 63 and the trigger A/D conversion circuit 64 both are in a rest state and the output unit 60 outputs neither of pixel data and trigger data. Furthermore, the control unit 80 does not output the clock signal CLK (step S6).

In the subsequent period from time $t_7$ to time $t_9$, the output unit 60 outputs N pixel data Ddata(1) according to accumulated charge amounts in the N pixel units $P_{1,1}$-$P_{1,N}$ in the first row of the imaging light-receiving unit 10. Specifically, in a period from time $t_7$ to time $t_8$, the Address(1) signal is turned to the low level only in the first row of the imaging light-receiving unit 10 to turn the transistor T4 on, whereby a voltage value according to the accumulated charge amount in each pixel unit $P_{1,n}$ in the first row is output onto the line Vline(n) to be held in the holding circuit $H_n$ of the voltage holding unit 50. During the subsequent period from time $t_8$ to time $t_9$, the voltage values sequentially output from the respective holding circuits $H_n$ are input through the difference calculation circuit 61 into the imaging A/D conversion circuit 63 to be subjected to A/D conversion, and N pixel data Ddata(1) are sequentially output from the imaging A/D conversion circuit 63 via the switch $SW_{61}$. During this period from time $t_7$ to time $t_9$, the clock signal CLK output from the control unit 80 is one synchronized with output timings of respective bits of the pixel data. The trigger A/D conversion circuit 64 is in a rest state and the switch $SW_{62}$ is opened.

In the further subsequent period from time $t_9$ to time $t_{11}$, the output unit 60 outputs N pixel data Ddata(2) according to accumulated charge amounts in the N pixel units $P_{2,1}$-$P_{2,N}$ in the second row of the imaging light-receiving unit 10. Specifically, in a period from time $t_9$ to time $t_{10}$, the Address(2) signal is turned to the low level only in the second row of the imaging light-receiving unit 10 to turn the transistor T4 on, whereby a voltage value according to the accumulated charge amount in each pixel unit $P_{2,n}$ in the second row is output onto the line Vline(n) to be held in the holding circuit $H_n$ of the voltage holding unit 50. During the subsequent period from time $t_{10}$ to time $t_{11}$, the voltage values sequentially output from the respective holding circuits $H_n$ are input through the difference calculation circuit 61 into the imaging A/D conversion circuit 63 to be subjected to A/D conversion and N pixel data Ddata(2) are sequentially output from the imaging A/D conversion circuit 63 via the switch $SW_{61}$. During this period from time $t_{10}$ to time $t_{11}$, the clock signal CLK output from the control unit 80 is one synchronized with output timings of respective bits of the pixel data. The trigger A/D conversion circuit 64 is in the rest state and the switch $SW_{62}$ is opened.

Thereafter, the output unit 60 similarly outputs N pixel data Ddata(m) according to accumulated charge amounts in the N pixel units $P_{m,1}$-$P_{m,N}$ in the mth row, in order from the third row to the Mth row of the imaging light-receiving unit 10. In this manner, the output unit 60 outputs the pixel data Ddata(1) to Ddata(M) of one frame from the imaging light-receiving unit 10 through the voltage holding unit 50, difference calculation circuit 61, imaging A/D conversion circuit 63, and switch $SW_{61}$.

When the readout of the pixel data of one frame is completed in this manner, the control unit 80 turns the gain_sel signal to the low level to open the switch $SW_{67}$. This permits the control unit 80 to change the total accumulation capacitance value of the integrating circuit 62 for the electric charge output from the trigger light-receiving unit 20 and thereby to change the sensitivity of the integrating circuit 62 to the trigger PD to the high sensitivity level for detection of the presence/absence of incident light in a next frame. In this way, the solid-state imaging apparatus 1 returns to the same state as before time $t_0$, after the output of the pixel data of one frame.

The below will describe the action and effect of the solid-state imaging apparatus 1 and imaging method according to the first embodiment. In this first embodiment, the control unit 80 varies the charge accumulation capacitance value of the integrating circuit 62 between the different levels before and after the detection of incident light, whereby it is able to switch the sensitivity of the integrating circuit 62 to the trigger PD. This makes it feasible to set the sensitivity of the integrating circuit 62 to the trigger PD as high as possible before detection of incident light, so as to be highly sensitive to incident light. It is also feasible to set the sensitivity of the integrating circuit 62 to the trigger PD as low as possible, so as to avoid saturation of the output signal from the trigger PD in the integrating circuit 62. As described above, the first embodiment enables optimal utilization of the trigger PD in such a manner that the control unit 80 varies the charge accumulation capacitance value of the integrating circuit 62 between the different levels before and after the detection of incident light to switch the sensitivity of the integrating circuit 62 to the trigger PD.

In the first embodiment, when the determination unit 70 determines that there is incident light, consideration is given to whether the instantaneous peak value of the output value from the output unit 60 and the accumulated total thereof during the predetermined period are not less than the respective predetermined thresholds. This permits the determination unit to determine whether the output signal from the trigger PD is based on actual exposure of incident light or due to other noise. The reason for it is that it is often the case in detection of noise that the output signal from the trigger PD through the integrating circuit 62 has a peak value at a certain magnitude but the value is generally instantaneous, without continuity over the predetermined period.

The above explained the preferred first embodiment of the present invention, but it is needless to mention that the present invention is not limited to the above embodiment.

For example, the above embodiment showed the example wherein the termination timing of the charge accumulation operation was determined based on whether the total exposure of incident light to the solid-state imaging apparatus 1 reached the predetermined threshold, but, without having to be limited to this, it is also possible, for example, to determine a point where the trigger data output from the output unit 60 becomes smaller than a certain level, as the termination timing of the charge accumulation operation. In another case where the amount of incident light can be preliminarily estimated, the charge accumulation time may be set to an appropriate value, based on the estimate.

Second Embodiment

The second embodiment of the present invention will be described below. The second embodiment of the present invention is different mainly in the position of the determination unit 70 from the first embodiment described above. The second embodiment will be described below with focus on this difference.

Figure 8:
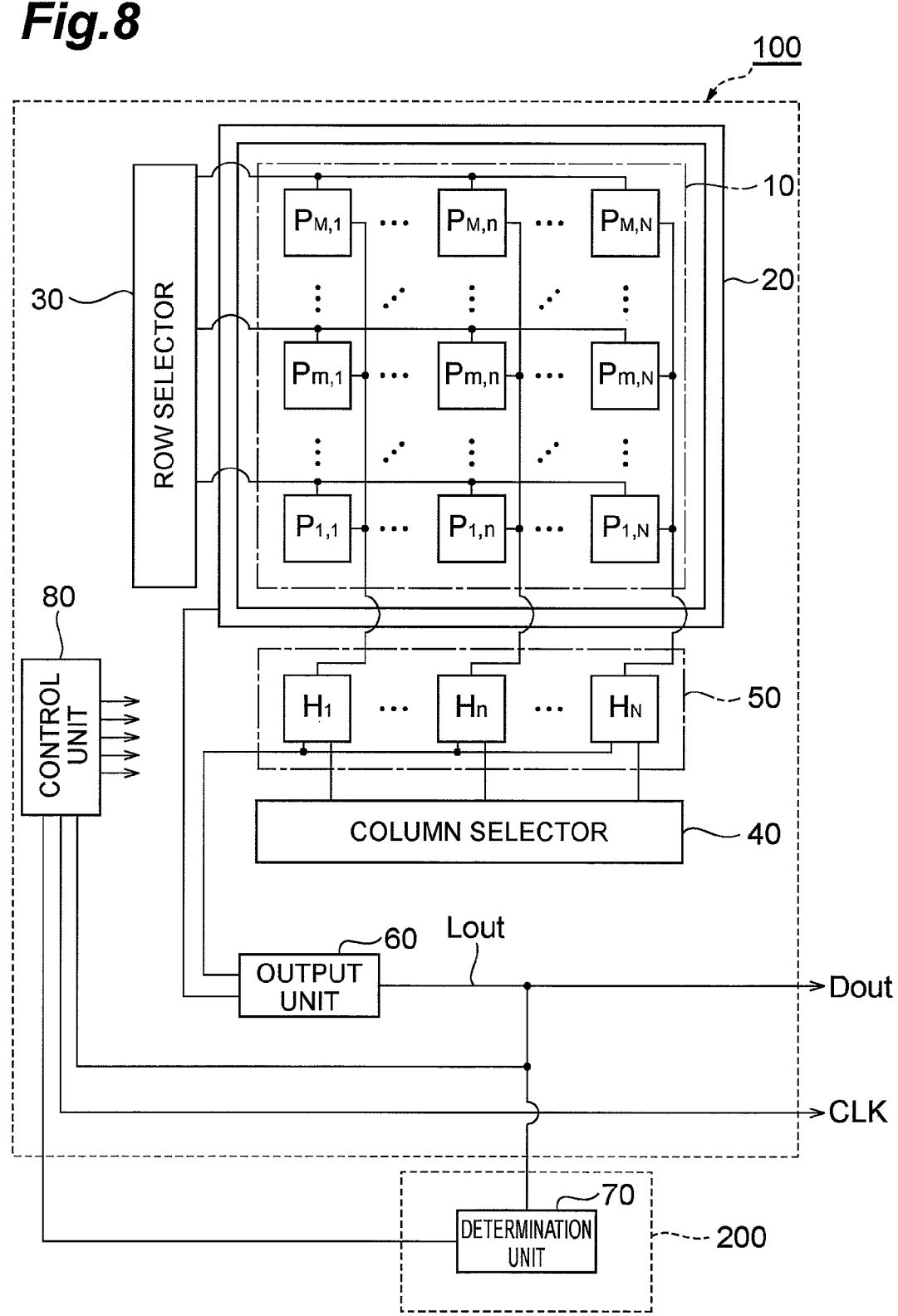
FIG. 8 is a schematic diagram of a configuration of a solid-state imaging apparatus according to the second embodiment.

FIG. 8 is a schematic diagram of a configuration of solid-state imaging apparatus 100 according to the second embodiment. The solid-state imaging apparatus 100 shown in this figure has imaging light-receiving unit 10 (imaging photodetecting means), trigger light-receiving unit 20 (trigger photodetecting means), row selector 30, column selector 40, voltage holding unit 50, output unit 60 (output means), and control unit 80 (controlling means). The determination unit 70 is provided as external IC200 separately outside the solid-state imaging apparatus 100. The determination unit 70 is provided so as to be able to retrieve the output from the output unit 60 and to output its own output to the control unit 80. In this figure, interconnections between elements are omitted or simplified.

The output unit 60 outputs the trigger data being a digital value according to an amount of the electric charge generated in the trigger light-receiving unit 20, to the determination unit 70 provided as external IC200. The determination unit 70 determines whether there is incident light to the solid-state imaging apparatus 1, based on the trigger data input from the output unit 60, and generates a determinated signal (external input signal) indicating the determinated result. Then the determination unit 70 outputs the generated determinated signal to the control unit 80.

Figure 9:
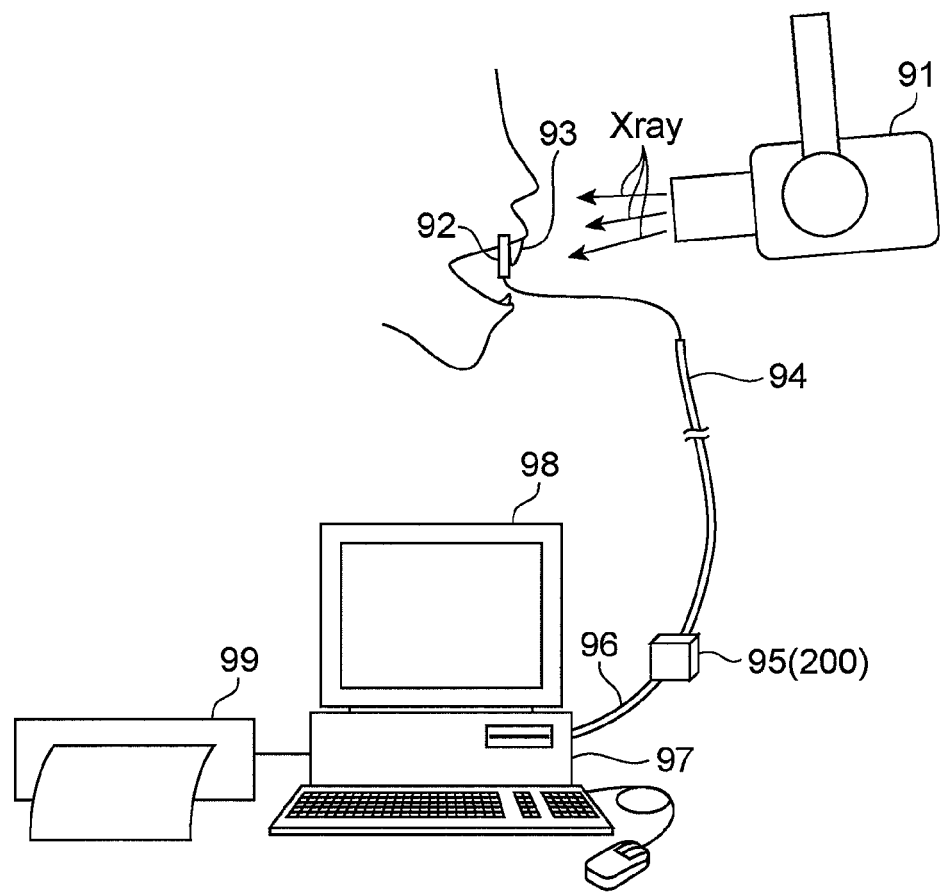
FIG. 9 is a schematic diagram showing an example of application of the solid-state imaging apparatus 100 shown in FIG. 8, to diagnosis of teeth.
Figure 10:
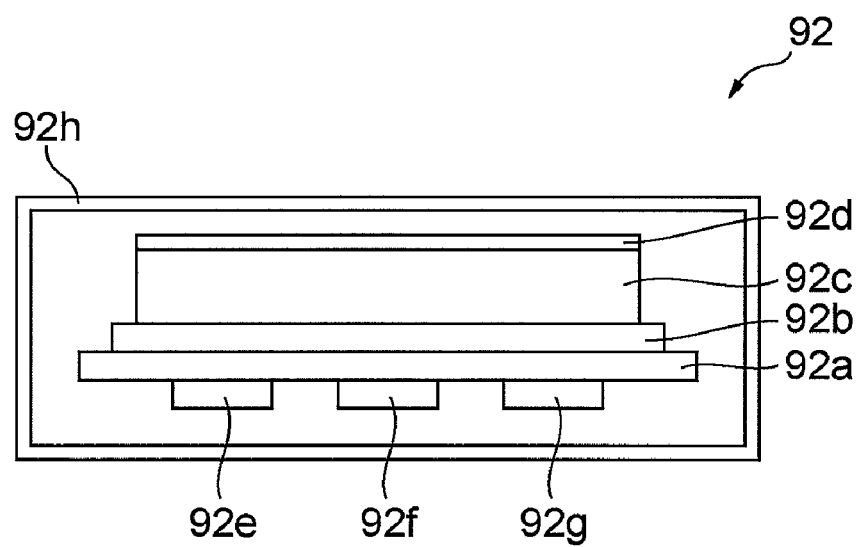
FIG. 10 is a sectional view showing an interior of sensor package 92 in FIG. 9.

FIG. 9 is a schematic diagram showing an example in which the solid-state imaging apparatus 100 of the second embodiment described above is applied to diagnosis of teeth. As shown in FIG. 9, an X-ray source 91 to radiate X-rays, and a sensor package 92 are set opposite to each other with patient's teeth 93 in between. FIG. 10 is a sectional view showing the interior of the sensor package 92. As shown in FIG. 10, a semiconductor chip 92*b* including the imaging light-receiving unit 10, the trigger light-receiving unit 20, and others is provided on a substrate 92*a*. An optical fiber plate 92*c* and a scintillator 92*d* are disposed on the semiconductor chip 92*b*. A capacitor 92*e*, crystal oscillator 92*f*, connector 92*g*, and others are arranged on the lower side of the substrate 92*a*. The internal devices of the sensor package 92 described above are arranged inside a cover 92*h*.

Referring back to FIG. 9, a processing box 95 with the external IC200 therein is connected through first cable 94 to the sensor package 92. Furthermore, a control device 97 is connected through second cable 96 to the processing box 95. A monitor 98 to display an X-ray image of teeth and a printer 99 to output the display content are connected to the control device 97. If in FIG. 9 the processing box 95 with the external IC200 therein is provided, for example, together with the control unit 80 inside the control device 97, this case can be said to be equal to the first embodiment.

The solid-state imaging apparatus 100 of the second embodiment has the same action and effect as the solid-state imaging apparatus 1 of the first embodiment. Furthermore, since the determinated signal (external input signal) is generated outside the apparatus, it is feasible to flexibly adjust the conditions in generation of the external input signal in the external IC200.

INDUSTRIAL APPLICABILITY

The present invention provides the solid-state imaging apparatus and imaging method enabling optimal utilization of the trigger photodiode.

The invention claimed is:

1. A solid-state imaging apparatus comprising:
  imaging photodetecting means including a plurality of pixel units each of which has a photodiode to generate an electric charge in an amount according to a quantity of incident light, and a charge accumulating portion to accumulate the electric charge, said imaging photodetecting means being configured to accumulate the electric charge generated in the photodiode, in the charge accumulating portion in each of the plurality of pixel units;
  trigger photodetecting means including a trigger photodiode to generate an electric charge in an amount according to a quantity of incident light;
  output means configured to output a value according to an amount of the electric charge accumulated in the charge accumulating portion in each of the plurality of pixel units, said output means including an integrating circuit to accumulate the electric charge generated in the trigger photodetecting means, in a variable capacitance portion, and being configured to output a value according to an amount of the electric charge accumulated in the integrating circuit;
  determinating means configured to determine whether there is incident light to the trigger photodetecting means, based on the output value from the integrating circuit, and to generate a determinated signal indicating a determinated result; and
  controlling means configured to control the charge accumulating portions of the imaging photodetecting means whether or not to start accumulation of the electric charge and to change a capacitance value of the variable capacitance portion in the integrating circuit of the output means, based on the determinated signal input from the determinating means.

2. The solid-state imaging apparatus according to claim 1, wherein the determinating means determines that there is incident light, if a peak value of the output value from the integrating circuit is not less than a predetermined threshold and if an accumulated total of the output value from the integrating circuit during a predetermined period is not less than a predetermined threshold.

3. The solid-state imaging apparatus according to claim 2, wherein the controlling means controls the charge accumulating portions to start the accumulation of the electric charge and increases the capacitance value of charge accumulation of the integrating circuit if the determinated signal indicates that there is incident light.

4. The solid-state imaging apparatus according to claim 1, wherein the controlling means controls the charge accumulating portions to start the accumulation of the electric charge and increases the capacitance value of charge accumulation of the integrating circuit if the determinated signal indicates that there is incident light.

5. A solid-state imaging apparatus comprising:
  imaging photodetecting means including a plurality of pixel units each of which has a photodiode to generate an electric charge in an amount according to a quantity of incident light, and a charge accumulating portion to accumulate the electric charge, said imaging photodetecting means being configured to accumulate the electric charge generated in the photodiode, in the charge accumulating portion in each of the plurality of pixel units;
  trigger photodetecting means including a trigger photodiode to generate an electric charge in an amount according to a quantity of incident light;
  output means configured to output a value according to an amount of the electric charge accumulated in the charge accumulating portion in each of the plurality of pixel units, said output means including an integrating circuit to accumulate the electric charge generated in the trigger photodetecting means, in a variable capacitance portion, and being configured to output a value according to an amount of the electric charge accumulated in the integrating circuit; and
  controlling means configured to control the charge accumulating portions of the imaging photodetecting means whether or not to start accumulation of the electric charge, based on an external input signal generated based on the output value from the integrating circuit and indicating whether there is incident light to the trigger photodetecting means, and to change a capacitance value of the variable capacitance portion in the integrating circuit of the output means.

6. The solid-state imaging apparatus according to claim 5, wherein the controlling means controls the charge accumulating portions to start the accumulation of the electric charge and increases the capacitance value of charge accumulation of the integrating circuit if the external input signal indicates that there is incident light.

7. An imaging method comprising:
   a trigger photodetecting step wherein trigger photodetecting means including a trigger photodiode generates an electric charge in an amount according to a quantity of incident light;
   a first output step wherein output means including an integrating circuit to accumulate the electric charge generated in the trigger photodetecting step, in a variable capacitance portion outputs a value according to an amount of the electric charge accumulated in the integrating circuit;
   a determinating step wherein determinating means determines whether there is incident light to the trigger photodetecting means, based on the value output in the first output step, and generates a determinated signal indicating a determinated result;
   a controlling step wherein controlling means controls the charge accumulating portions of the imaging photodetecting means whether or not to start accumulation of the electric charge and changes a capacitance value of the variable capacitance portion in the integrating circuit of the output means, based on the determinated signal generated in the determinating step;
   an imaging photodetecting step wherein, under the control in the controlling step, the imaging photodetecting means including a plurality of pixel units each of which has a photodiode to generate an electric charge in an amount according to a quantity of incident light, and a charge accumulating portion to accumulate the electric charge, accumulates the electric charge generated in the photodiode, in the charge accumulating portion in each of the plurality of pixel units; and
   a second output step wherein the output means outputs a value according to an amount of the electric charge accumulated in the charge accumulating portion in each of the plurality of pixel units of the imaging photodetecting means.

8. An imaging method according to claim 7, wherein the determinating means determines that there is incident light, if a peak value of the output value from the integrating circuit is not less than a predetermined threshold and if an accumulated total of the output value from the integrating circuit during a predetermined period is not less than a predetermined threshold.

9. An imaging method comprising:
   a trigger photodetecting step wherein trigger photodetecting means including a trigger photodiode generates an electric charge in an amount according to a quantity of incident light;
   a first output step wherein output means including an integrating circuit to accumulate the electric charge generated in the trigger photodetecting step, in a variable capacitance portion outputs a value according to an amount of the electric charge accumulated in the integrating circuit;
   a controlling step wherein controlling means controls the charge accumulating portions of the imaging photodetecting means whether or not to start accumulation of an electric charge, based on an external input signal generated based on the value output in the first output step and indicating whether there is incident light to the trigger photodetecting means, and changes a capacitance value of the variable capacitance portion in the integrating circuit of the output means;
   an imaging photodetecting step wherein, under the control in the controlling step, the imaging photodetecting means including a plurality of pixel units each of which has a photodiode to generate an electric charge in an amount according to a quantity of incident light, and a charge accumulating portion to accumulate the electric charge, accumulates the electric charge generated in the photodiode, in the charge accumulating portion in each of the plurality of pixel units; and
   a second output step wherein the output means outputs a value according to an amount of the electric charge accumulated in the charge accumulating portion in each of the plurality of pixel units of the imaging photodetecting means.

\* \* \* \* \*